US009071642B2

(12) United States Patent
Kernene

(10) Patent No.: US 9,071,642 B2
(45) Date of Patent: *Jun. 30, 2015

(54) SYSTEM AND METHOD FOR SECURELY TRANSMITTING DATA USING VIDEO VALIDATION

(76) Inventor: Nicolas Kernene, St. Charles, IL (US)

( * ) Notice: Subject to any disclaimer, the term of this patent is extended or adjusted under 35 U.S.C. 154(b) by 496 days.

This patent is subject to a terminal disclaimer.

(21) Appl. No.: 13/411,326

(22) Filed: Mar. 2, 2012

(65) Prior Publication Data

US 2012/0222054 A1 Aug. 30, 2012

Related U.S. Application Data

(63) Continuation of application No. 12/188,793, filed on Aug. 8, 2008, now Pat. No. 8,132,252.

(60) Provisional application No. 60/954,660, filed on Aug. 8, 2007.

(51) Int. Cl.
H04N 7/16 (2011.01)
H04L 29/06 (2006.01)
H04L 29/08 (2006.01)

(52) U.S. Cl.
CPC ........... *H04L 63/18* (2013.01); *H04L 2463/102* (2013.01); *H04L 65/4007* (2013.01); *H04L 67/02* (2013.01)

(58) Field of Classification Search
CPC . H04N 7/17309; H04N 7/1731; H04N 7/165; H04N 7/17318
See application file for complete search history.

(56) References Cited

U.S. PATENT DOCUMENTS

| 5,800,268 | A | 9/1998 | Molnick |
| 5,851,149 | A | 12/1998 | Xidos et al. |
| 6,503,146 | B2 | 1/2003 | Walker et al. |
| 6,508,709 | B1 | 1/2003 | Karmarkar |
| 6,527,638 | B1 | 3/2003 | Walker et al. |
| 6,565,084 | B1 | 5/2003 | Katz et al. |
| 6,575,831 | B1 | 6/2003 | Gonen et al. |
| 6,575,834 | B1 | 6/2003 | Lindo |

(Continued)

OTHER PUBLICATIONS

International Search Report and Written Opinion mailed Aug. 4, 2008 in related International Application No. PCT/US07/13172.

(Continued)

*Primary Examiner* — Nathan Flynn
*Assistant Examiner* — Alfonso Castro
(74) *Attorney, Agent, or Firm* — Ostrolenk Faber LLP

(57) ABSTRACT

Secure transmission of electronic information is provided between two parties. Included is a first data communication session between a first computing device and a second computing device, wherein the first data communication session is via a first communication protocol. Further, first information is transmitted via the first communication protocol that is received via the first communication protocol. During the first communication session, a second data communication session is provided between the first computing device and the second computing device. The second communication session is via a second communication protocol, which is more secure than the first communication protocol. Second information is transmitted via the second communication protocol that is received via the second communication protocol. The second information relates at least partially to the first information. Moreover, the second communication session appears to a user of the first computing device to be the first communication session.

26 Claims, 4 Drawing Sheets

(56) References Cited

U.S. PATENT DOCUMENTS

| | | |
|---|---|---|
| 6,582,301 B2 | 6/2003 | Hill |
| 6,945,870 B2 | 9/2005 | Gatto et al. |
| 6,965,868 B1 | 11/2005 | Bednarek |
| 2002/0037767 A1 | 3/2002 | Ebin |
| 2002/0086734 A1 | 7/2002 | Krishnan et al. |
| 2002/0094869 A1 | 7/2002 | Harkham |
| 2002/0128057 A1 | 9/2002 | Walker et al. |
| 2003/0003997 A1 | 1/2003 | Vuong et al. |
| 2003/0004871 A1 | 1/2003 | Rowe |
| 2003/0199313 A1 | 10/2003 | Gonen et al. |
| 2004/0003412 A1 | 1/2004 | Halbert |
| 2004/0009812 A1 | 1/2004 | Scott et al. |
| 2004/0023722 A1 | 2/2004 | Vuong et al. |
| 2004/0031057 A1 | 2/2004 | Waites |
| 2004/0210507 A1 | 10/2004 | Asher et al. |
| 2005/0043094 A1 | 2/2005 | Nguyen et al. |
| 2005/0064926 A1 | 3/2005 | Walker et al. |
| 2005/0085291 A1 | 4/2005 | Lindo |
| 2005/0170883 A1 | 8/2005 | Muskin |
| 2005/0197190 A1 | 9/2005 | Amaitis et al. |
| 2005/0227757 A1 | 10/2005 | Simon |
| 2006/0009274 A1 | 1/2006 | Finocchio |
| 2006/0015904 A1 | 1/2006 | Marcus |
| 2006/0046835 A1 | 3/2006 | Walker et al. |
| 2006/0046853 A1 | 3/2006 | Black |
| 2006/0155638 A1 | 7/2006 | de la Motte |
| 2008/0020814 A1 | 1/2008 | Kernene |

OTHER PUBLICATIONS

International Search Report and Written Opinion mailed on Nov. 5, 2008 in corresponding International Application No. PCT/US2008/09557.

SYSTEM AND METHOD FOR SECURELY TRANSMITTING DATA USING VIDEO VALIDATION

CROSS-REFERENCE TO RELATED APPLICATIONS

This patent application is a continuation of U.S. patent application Ser. No. 12/188,793, filed on Aug. 8, 2008, and entitled "SYSTEM AND METHOD FOR SECURELY TRANSMITTING DATA USING VIDEO VALIDATION," which is based on and claims priority to U.S. Provisional Patent Application Ser. No. 60/954,660, filed on Aug. 8, 2007, and entitled "SYSTEM AND METHOD FOR SECURELY TRANSMITTING DATA USING VIDEO VALIDATION," which refers to and is partially based upon U.S. patent application Ser. No. 11/757,953, filed on Jun. 4, 2007, and entitled "BROADBAND GAMING SYSTEM AND METHOD," the entire contents of which are incorporated herein by reference.

BACKGROUND

1. Field of the Invention

The present invention relates to middleware technology, and, more particularly, to security and validation with respect to remote user interactions.

2. Description of the Related Art

In the prior art, sensitive data, such as provided in a typical e-commerce application, are not securely isolated from the internet and from potential harm and/or abuse. Although prior art data security measures make a hacker's job difficult, access to sensitive data unfortunately remains possible in the prior art. Further, a repetitive cycle has emerged in the prior art as hackers overcome security measures, new security measures are installed, and hackers overcome the new measures, only for yet newer measures to be installed. Accordingly, continuous maintenance and updates are required, and yet sensitive data such as related to e-commerce applications are not secure over time. It is believed that tens of billions of dollars are lost to data security-related issues.

Privacy and security remain important components of industry growth for e-retailers and their customers. Despite the significant market growth, consumers remain apprehensive about using a debit card or credit card to order goods on-line. A lack of consumer confidence combined with estimates of loss attributed to privacy and security fraud results in a setback for the industry. Furthermore, although the financial industry continues to benefit from robust online banking transactions, an impact is felt that is due to revenue loss and an erosion of consumer confidence from ineffective security measures that continue to allow fraud and piracy.

Further, fraud and security breach losses are not just a part of big business; they are big barriers to business. Businesses, manufacturers, trade and consumer associations and governments worldwide spend millions of dollars publicizing, packaging and advertising whenever they add new security measures or enact new safety, privacy and anti-fraud standards. Businesses must regularly invest in the reliability and the security of their e-commerce, data sharing, and payment methods, in part to persuade their customers that critical data are kept safe.

SUMMARY

The process described herein addresses these failures by employing improved security measures in connection with remote communications.

Accordingly, a system and method is disclosed for secure transmission of electronic information between two parties. A first data communication session between a first computing device and a second computing device, wherein the first data communication session is via a first communication protocol. Further, the first computing device transmits first information via the first communication protocol that is received by the second computing device via the first communication protocol. During the first communication session, a second data communication session is provided between the first computing device and the second computing device. The second communication session is via a second communication protocol, which is more secure than the first communication protocol. The first computing device transmits second information via the second communication protocol that is received by the second computing device the second information via the second communication protocol. The second information relates at least partially to the first information. Moreover, the second communication session appears to a user of the first computing device to be the first communication session.

Other features and advantages of the present invention will become apparent from the following description of the invention that refers to the accompanying drawings.

BRIEF DESCRIPTION OF THE DRAWINGS

For the purpose of illustration, there is shown in the drawings a form which is presently preferred, it being understood, however, that the invention is not limited to the precise arrangements and instrumentalities shown. The features and advantages of the descriptions herein will become apparent from the following description that refers to the accompanying drawing, in which.

DESCRIPTION OF EMBODIMENTS

In accordance with the teachings herein, a new way to transmit data securely, such as to complete financial transactions, over the internet is provided without the transmission of any private data through the internet.

Information may be sent or received via an internet web sites comprising a related set of files which are maintained in one or more computer systems (e.g., web servers) and which, when transmitted to a user terminal, cause a user terminal to display and/or execute programmatic operations corresponding to the data contained in the files. Typically, the files comprising the web site are prepared using one or more of a combination of Hyptertext Mark-Up Language (HTML), Extendable Mark-Up Language (XML), Java Applets, ActiveX programs, Standard Generalized Mark-Up Language (SGML) files and the like. Web site files are typically transmitted to a user terminal using one or more protocols, such as the Hyptertext Transfer Protocol (HTTP) under the Transmission Control Protocol/Internet Protocol (TCP/IP) suite of communication protocols.

Moreover, interactive video techniques are preferably implemented such that interactive data entry forms are provided via video in lieu of or in addition to data entry forms provided using HTTP and, for example, in HTML.

Also as used herein, the term, "browser" refers to an application program residing and executing on a user terminal which functions as an HTTP client, sending requests to web servers for web site files. A request is typically sent in the form of a Uniform Resource Locator (URL) or by selecting a hypertext link presented on the user terminal display. The browser functions to format the file and/or data received from the web server and format the received files and/or data in the manner described therein, displaying the same on the user terminal. Examples of browser programs include MICROSOFT INTERNET EXPLORER and NETSCAPE NAVIGATOR.

As used herein, the term, "module," refers, generally, to one or more discrete components that contribute to the effectiveness of the present invention. Modules can include software elements, including but not limited to functions, algorithms, classes and the like. Modules also include hardware elements, substantially as described below. Modules can operate independently or, alternatively, depend upon one or more other modules in order to function.

Figure 1:
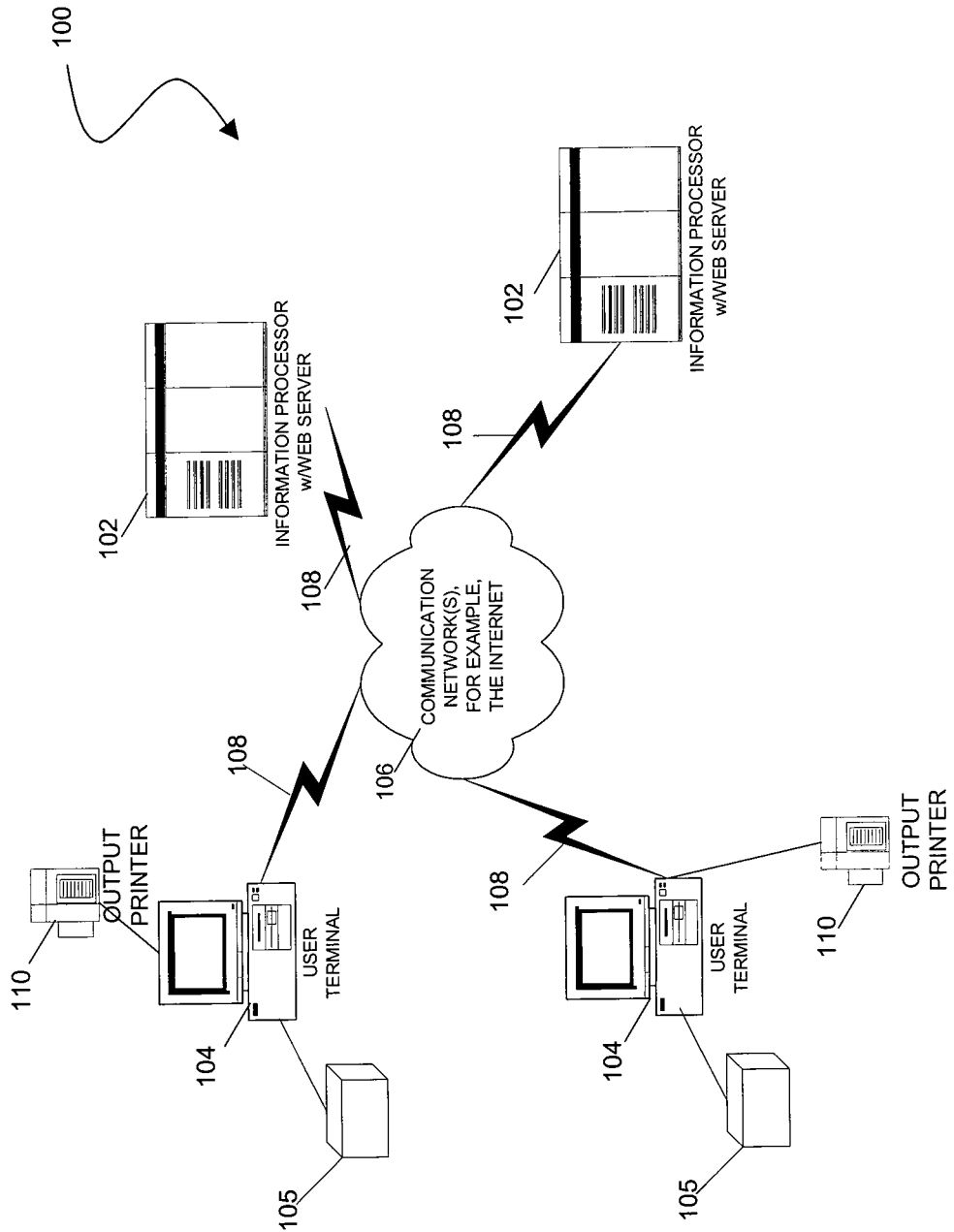
FIG. 1 is a diagram of an example hardware arrangement that operates for control allocation of assets and rights, constructed in accordance with a preferred embodiment.

Referring now to the drawings figures in which like reference numerals refer to like elements, there is shown in FIG. 1 a diagram of an example hardware arrangement in accordance with the teachings herein, and designated generally as system 100. System 100 is preferably comprised of one or more information processors 102 coupled to one or more user terminals 104 across communication network 106. Further, printed output is provided, for example, via output printers 110.

Information processor 102 preferably includes all necessary databases for the present invention. However, it is contemplated that information processor 102 can access any required databases via communication network 106 or any other communication network to which information processor 102 has access. Information processor 102 can communicate devices comprising databases using any known communication method, including a direct serial, parallel, USB interface, or via a local or wide area network.

User terminals 104 communicate with information processors 102 using data connections 108, which are respectively coupled to communication network 106. Communication network 106 can be any communication network, but is typically the Internet or some other global computer network. Data connections 108 can be any known arrangement for accessing communication network 106, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User terminals 104 are preferably coupled to or operate in conjunction with a set top box 105, such as a custom configured television set top box. Initially, the user connects to a web site via user terminal 104 and an HTTP connection. Thereafter, when the user desires to transmit sensitive or private data, such as to pay for a good in an e-commerce web site, the user communicates via interactive video in a session that preferably operates concurrently with the HTTP session. The interactive video session is preferably routed securely through a middleware platform, described in greater in co-pending and U.S. patent application Ser. No. 11/757,953 (incorporated herein by reference) and via set top box 105.

User terminals 104 preferably have the ability to send and receive data across communication network 106, and are equipped with web browsers to display the received data on display devices incorporated therewith. By way of example, user terminal 104 may be personal computers such as Intel Pentium-class computers or Apple Macintosh computers, but are not limited to such computers. Other terminals which can communicate over a global computer network such as palm-top computers, personal digital assistants (PDAs) and mass-marketed Internet access devices such as WebTV can be used. In addition, the hardware arrangement of the present invention is not limited to devices that are physically wired to communication network 106. Of course, one skilled in the art will recognize that wireless devices can communicate with information processors 102 using wireless data communication connections (e.g., WIFI).

Figure 2:
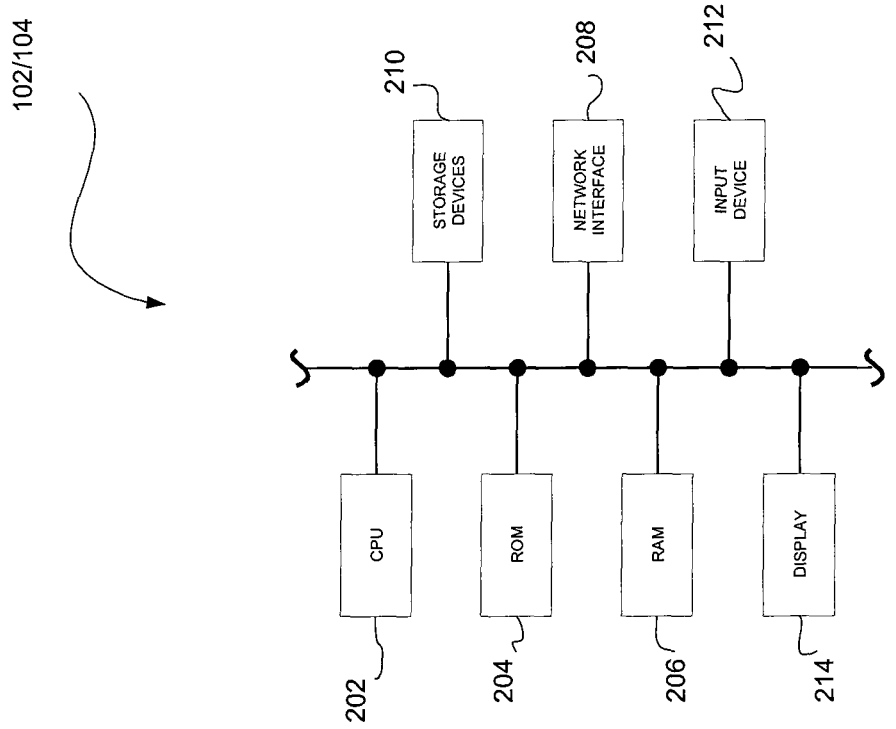
FIG. 2 is a block diagram illustrating functional elements of an information processor or user terminal in accordance with a preferred embodiment.

Referring now to FIG. 2 the functional elements of each information processor 102 or user terminal 104 preferably include one or more central processing units (CPU) 202 used to execute software code in order to control the operation of information processor 102, read only memory (ROM) 204, random access memory (RAM) 206, one or more network interfaces 208 to transmit and receive data to and from other computing devices across a communication network, storage devices 210 such as a hard disk drive, floppy disk drive, tape drive, CD-ROM or DVD drive for storing program code, databases and application code, one or more input devices 212 such as a keyboard, mouse, track ball and the like, and a display 214.

The various components of information processor 102 need not be physically contained within the same chassis or even located in a single location. For example, as explained above with respect to databases which can reside on storage device 210, storage device 210 may be located at a site which is remote from the remaining elements of information processors 102, and may even be connected to CPU 202 across communication network 106 via network interface 208.

The functional elements shown in FIG. 2 (designated by reference numbers 202-214) are preferably the same categories of functional elements preferably present in user terminal 104. However, not all elements need be present, for example, storage devices in the case of PDAs, and the capacities of the various elements are arranged to accommodate expected user demand. For example, CPU 202 in user terminal 104 may be of a smaller capacity than CPU 202 as present in information processor 102. Similarly, it is likely that information processor 102 will include storage devices 210 of a much higher capacity than storage devices 210 present in work station 104. Of course, one of ordinary skill in the art will understand that the capacities of the functional elements can be adjusted as needed.

The nature of the present invention is such that one skilled in the art of writing computer executed code (software) can implement the described functions using one or more or a combination of a popular computer programming language including but not limited to C++, VISUAL BASIC, JAVA, ACTIVEX, HTML, XML, ASP, SOAP, DOCSIS (Data Over Cable Service Interface Specifications), OCAP (Open Cable Application Platform), and web application development environments.

As used herein, references to displaying data on user terminal 104 refer to the process of communicating data to the terminal across communication network 106 and processing the data such that the data can be viewed on the user terminal 104, via display 214 using a web browser or the like. The display screens on user terminal 104 present areas within system 100 such that a user can proceed from area to area within the system 100 by selecting a desired link. Therefore, each user's experience with system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of system 100.

Although the teachings herein are described by way of example herein in terms of a web-based system using web browsers and a web site server (information processor 102), system 100 is not limited to that particular configuration. It is contemplated that system 100 can be arranged such that user terminal 104 can communicate with, and display data received from, information processor 102 using any known communication and display method, for example, using a non-Internet browser Windows viewer coupled with a local area network protocol such as the Internetwork Packet Exchange (IPX). It is further contemplated that any suitable operating system can be used on user terminal 104, for example, WINDOWS 3.X, WINDOWS 95, WINDOWS 98, WINDOWS 2000, WINDOWS CE, WINDOWS NT, WINDOWS XP, WINDOWS VISTA, LINUX and any suitable PDA or palm computer operating system.

Preferably, interactive video techniques are preferably implemented such that interactive data entry forms are provided via video instead of data entry forms provided using the hypertext transport protocol ("HTTP") and, for example, in the hypertext transport markup language ("HTML"). In a preferred embodiment, a user uses a computing device equipped with an internet web browser, and the computing device is preferably coupled to or operates in conjunction with a set top box, such as a custom configured television set top box. Initially, the user connects to a web site via an HTTP connection. Thereafter, when the user desires to transmit sensitive or private data, such as to pay for a good in an e-commerce web site, the user communicates via interactive video in a session that preferably operates concurrently with the HTTP session. The interactive video session is preferably routed securely through a middleware platform, described in greater in co-pending and U.S. patent application Ser. No. 11/757,953 (incorporated herein by reference) and via the set top box.

The middleware platform preferably includes, inter alia, a media matching engine, a data matching engine, an internet security bridge and a video validation protocol. Moreover, non-recursive, non-pattern generating signatures are provided, thereby precluding any party that attempts to eavesdrop or otherwise intercept transmissions set forth herein gains no meaningful access to information. Accordingly, data are preferably filtered such that only reference information is transmitted and that identifying data, such as names, addresses, bank accounts or other personally identifying information, which may be used by unscrupulous parties, are not transmitted over the internet.

Private data transmissions occur via the secured interactive video session, and when the user (and the web site provider) has completed the private data transmissions, the less secured HTTP data communications resume. In this way, users are assured that sensitive and/or private data are not transmitted over the internet, but are instead routed via safe and secure "hard-wired" systems.

An example of the teachings herein is now provided with reference to an e-commerce application provided in conjunction with an internet web site.

A user operating a computing device that is coupled to a set top box connects to an internet web site operated by a vendor. The user connects to the vendor's web site using standard internet web browsing software. The web site offers goods for sale. Using the web site, the user selects items for purchase, and place the items in an e-commerce shopping cart. Once the user is done selecting items for purchase, the user continues the purchase operation, for example, by selecting a graphical screen control (e.g., a button) labeled "Check Out." Once the graphical screen control is selected, an interactive video session between the vendor and the user is established via the computing device and, accordingly, over the middleware platform provided by the teachings herein. The interactive video session is used to transmit private data, such as the user's personally identifiable information, credit card information and other information the user desires to keep private.

Continuing with the above example, the checkout page that the user interacts with, such as by filling in data entry fields related to the purchase, looks and behaves as though it were a standard secured web page, such as encrypted via secured sockets layer ("SSL"). As noted above, however, the page is generated video broadcast that originates via the middleware platform and transmitted via the set top box. Thus, although the data entry display screen appears seamlessly integrated with the web site to the user, the data entry display screen is not an internet-based form. Moreover, as the user types, the user's respective keystrokes are not recognized as typical input, i.e. ASCII characters. Instead, the keystrokes generate new video, which is transmitted securely via the middleware platform back to the vendor.

Accordingly, the user has an experience that mimics typing and filling out a typical internet web-based checkout page. Instead, the user is typing, and not merely filling in blank fields in a form. As the user types, new video corresponding to the user's actions, selections and/or intentions is generated. The video feedback allows the user to validate the video the user observes (substantially in real time) against the data the user intended to enter. Collectively, the process referred to herein is referred to, generally, as a video validation engine.

Preferably, the middleware platform and corresponding data security protocol are provided that ensure secure, efficient and convenient operations for remote end-users. In one embodiment, a physical hardware architecture is provided that utilizes a cable television infrastructure that is supported by multiple system operators. Other embodiments include an implementation that utilizes satellite television and cellular telephone technology.

In another embodiment, a back-office technology is provided that includes a data storage element for storing digital video, video metadata, customer metadata and/or sequenced customer metadata with video metadata. The various data that are stored are preferably consistently available for access for a customer service operation. In this way, customer service is provided with current and accurate data for problem resolution, responding to customer questions, and confirmation of transactions.

Further, disclosed is a financial transaction application that is operable to support a complete financial transaction, from start to finish. Sellers and purchasers alike preferably utilize the core middleware technology and back-office technology described herein for offering and/or selecting items and services for sale, and financial elements of the transaction are securely made without a threat of individual or corporate piracy. Further, the financial transaction application provided herein is operable for cable-television shopping. In another application, electronic and remote voting is provided in a secure fashion, and fees associated with voting, for example, during an interactive game are maintained under control by a proprietor of the systems and methods described herein.

In another embodiment, bridging internet transactions to secured cable systems is provided. Moreover, internet transactions are bridged over to secured satellite or mobile transmissions in accordance with the teachings herein. A bridging feature is provided wherein the topography of the internet is bridged to a cable multiple systems operator. Alternatively, bridging is provided for satellite television providers and cellular telephone providers.

Thus, the features and advantages of the systems and methods provided herein are supported at least in part by a media matching engine, a data matching engine, an internet security bridge and a video validation protocol. Moreover, non-recursive, non-pattern generating signatures are provided, thereby precluding any party that attempts to eavesdrop or otherwise intercept transmissions set forth herein gains no meaningful access to information. Accordingly, data are preferably filtered such that only reference information is transmitted and that identifying data, such as names, addresses, bank accounts or other personally identifying information, which may be used by unscrupulous parties, are not transmitted.

In yet another embodiment, time delay functionality is built into transmissions that guarantees the topology of least upper bound for the delay signatures. With regard to cellular telephone technology, cell switching delay methods, such as known in the art, are provided to guarantee that a transaction occurs in a single cell, at a single cell tower.

Preferably, systems and methods are provided herein for providing secure and efficient remote electronic interactions between suppliers of goods and services and consumers. Moreover, the systems and methods provided herein provide fulfillment of the goods and services. Preferably, a new arrangement of hardware and software elements and an arrangement of parties associated therewith operate to provide a new infrastructure that authenticates identities, locations and times associated with financial and data transactions, for example, in e-commerce transactions. As will become clear to one skilled in the art, the teachings herein reduce infrastructure and related costs, including for processing financial payments and product/service fulfillment, and ensure and improve data security and efficiency. For example, costs associated with hardware and software, such as in connection with initial purchases, leases and on-going maintenance fees, are eliminated by the teachings herein.

In particular and in accordance with an embodiment, a secure transfer of private and personal data is transmitted via an interactive cable medium and/or cellular telephone. Instead of merely placing a firewall, such as a router, proxy server or other known physical device, or, alternatively, security software that may operate as a firewall or other gateway, data are sent and validated through secure channels and used to confirm a person, location and time. Using the systems and methods described herein, transactions are protected and removed from hackers who would otherwise have access thereto, such via typical prior art internet and web site based transactions.

Preferably, the systems and methods herein are applicable to many services and define various business methods. For example, in a business-to-business ("B2B") retail environment as vendors are preferably charged a transactional fee to the proprietor hereof for use of the systems and methods disclosed herein. Further, in a B2B wholesale environment, e-commerce vendors preferably pay distributors a transactional fee and the distributors, in turn, pay a license fee to the proprietor hereof. Moreover, in a business-business-to-consumer ("B2C") environment, e-commerce shoppers are preferably charged a fee by multiple system operators and preferably on their current billing system which would be secured by the means described herein. Multiple system operator, accordingly, pays at least a portion of that revenue to the proprietor hereof.

It is further believed that new markets are likely to spurn and/or expand as a direct result of the teachings herein. For example, large purchases can be remotely facilitated now as buyers and sellers achieve greater peace of mind in connection with the sales. Furthermore, the voting, taxation and other government related operations can be safely, securely and efficiently provided to end users. Moreover, cable television operators can realize increased profits in monthly billing. Furthermore, banks, financial service providers and insurance companies would further benefit from the security and improved data transmission layers.

In a preferred embodiment, payment-related information is securely transmitted via the data transmission source, described herein. Alternatively, e-commerce vendors initiate a session implementing the systems and methods herein during a checkout process. Multiple system operators and/or a proprietor hereof preferably are remunerated therefor.

Thus, in accordance with the foregoing, any company that has products or services which manage or assist in the securing of financial and data transactions for, for example, e-commerce vendors can partner with a proprietor hereof. For example, providers, such as CISCO, may benefit as the infrastructure according the teachings herein is reduced. Further, payment processors, such as PAYPAL, may benefit as costs associated with payment are reduced in accordance with the teachings herein. Further, security providers, such as CISCO and/or VERISIGN, may also benefit as data are secured while in transit, and safely off of the internet.

In one embodiment, live digital video feed is synchronized with real time auditing data that represents a person's actions, graphical screen control selections, indications, and/or financial purchases. A data audit trail is preferably instantly generated that corresponds to a person's activities to during a real-time event that is substantially simultaneously shown via digital video transmission. Preferably, small-sized data elements and/or small quantities of data elements are transmitted from a channel that consequently trigger applications and/or graphics for the user to select. In one embodiment, the term, "channel" refers generally to a full cable station, a sub-channel on a station, or and interactive add-in to an existing channel, as known in the art.

As will be clear to one skilled in the art, a new technology that greatly improves the speed of data transactions by enabling the transport of large amounts of information without a requirement for transmitting large quantities of data is provided herein. This preferably occurs as a function of metadata that represents and correlates with associated digital video data. By transmitting corresponding metadata and not the corresponding digital video, which requires significantly more bandwidth, performance is substantially faster than prior art transmissions.

In a preferred embodiment, and as described in greater detail below, media asset management is provided and replaces cost-prohibitive integration of, for example, customized or proprietary enterprise resource planning applications. In typical prior art installations of enterprise resource planning ("ERP") applications, as known in the art, often result in a customer incurring substantial fees. Expenses in the tens of millions of dollars of hidden costs for EAI (enterprise application integration) are not uncommon in multiple large-scale applications that require integration (to be able to share) and share information. The union of a media matching engine with a data matching engine, as described herein, provides a sort of universal card catalog system, in which multiple applications can draw from, store, and relate, data cataloged from multiple sources.

The data matching engine is operable to track user activity in relation to video feed, and tracking user response to video is provided without a need for a return feed of the video. Moreover, software is provided for freeze-on-demand help screens during interaction with the interactive video. In this way, video transmission of data entry and or other content is paused while a help screen or other display is reviewed by user. The transmission preferably resumes from the point where the transmission or entry was paused.

The hardware and software architecture provided herein is designed to protect against and/or to address distributed denial of service ("DDoS") attacks, blackmail, identity fraud, age verification and money laundering. Moreover, responsible advertising, age verification standards and player protection measures are concerns that are addressed by the technological advancements provided herein.

Preferably, the application is provided that, in one or more embodiments, uses at least a non-proprietary set top box, data matching engine, and video matching engine which integrally plug into and comply with existing technology including, for example, OpenCable Applications Platform ("OCAP") programming and Data Over Cable Service Interface Specification ("DOCSIS") protocol.

Figure 3:
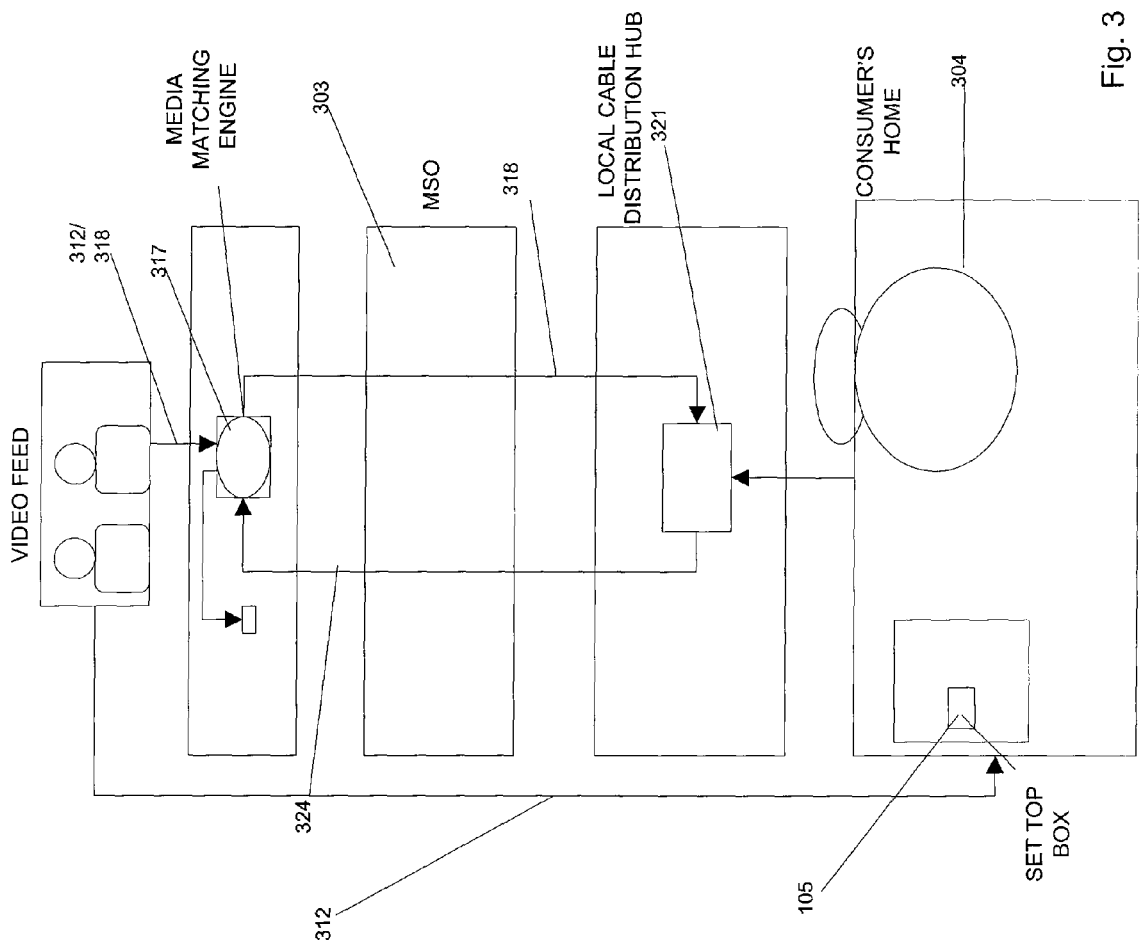
FIG. 3 illustrates an embodiment of an example arrangement including an example flow of information and order of operation in accordance with an embodiment.

FIG. 3 illustrates an embodiment of an example arrangement including an example flow of information and order of operation in accordance with an embodiment. As shown in FIG. 3, video feed 312 is transmitted to a user terminal 104, for example, at the user's home. Video feed 312 and video metadata 318 are preferably sent to media matching engine 317, and sequenced together. The sequenced video metadata 318 without video feed 312 is preferably transmitted data matching engine 321, and preferably located at a secure location close to user terminal 104. While user operating user terminal 104 watches video feed 312, the user decides to make a purchase. A request for purchase/transaction is sent to data matching engine 321. The transaction is preferably validated by matching the user's request with video metadata 318, thereby providing matched metadata 324. The matched metadata 324 is transmitted to the media matching engine 317, for example, to process a financial transaction and fulfillment. The completed transaction is preferably stored in information processor 102, such as a media asset management server, for example, for auditing and customer service.

Preferably, the application is provided that, in one or more embodiments, uses at least a non-proprietary set top box, data matching engine, and video matching engine which integrally plug into and comply with existing technology including, for example, OpenCable Applications Platform ("OCAP") programming and Data Over Cable Service Interface Specification ("DOCSIS") protocol.

One skilled in the art will appreciate that the broadcast channel or middleware applications, described above, provide an added value to user terminal 104 or other entertainment show that can be delivered as a full cable channel, a sub-channel on interactive Cable, or as an add-in to an existing channel, or even a single show.

Figure 4:
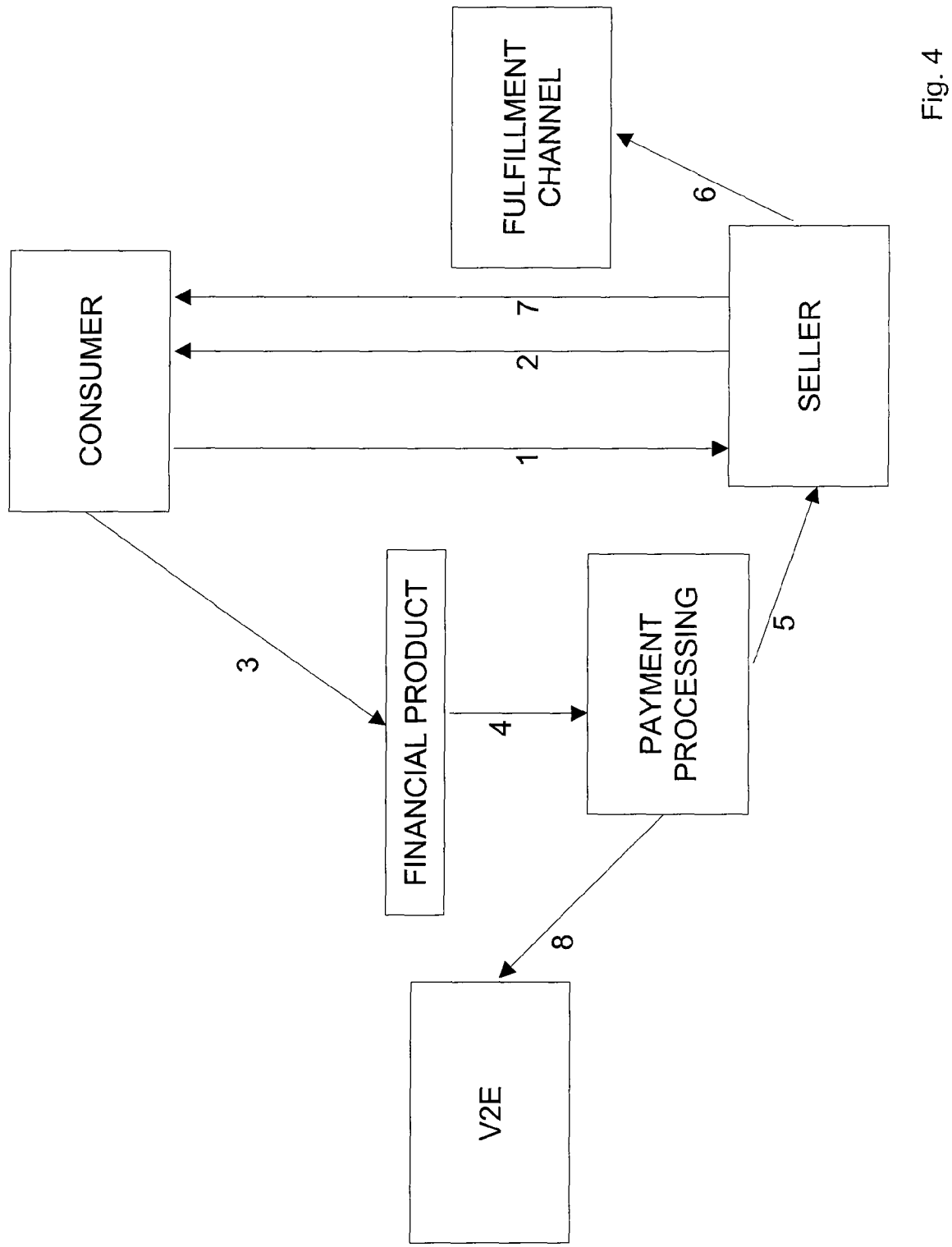
FIG. 4 illustrates an embodiment of an example arrangement and flow of information in accordance with an embodiment.

FIG. 4 illustrates an embodiment of an example arrangement and flow of information in accordance with the teachings herein. At step 1, a consumer (user 204) decides to make a purchase. Thereafter, at step 2, a data transport begins, wherein the seller offers data transfer via the teachings herein or, alternatively, the user 204 selects data transfer via the teachings herein. Thereafter, at step 3, user 204 executes a payment method and a financial product is executed. A payment request is sent at step 4 to a payment processing center, and, at step 5, the financial transaction is validated, the user's 204 account is credited or debited, and a verification of the transaction is transmitted to the seller. The seller maintains an active communication session with, for example, information processor 102, which may be formatted as a media asset management server.

Continuing with reference to FIG. 4, at step 6, the seller begins a fulfillment process and, via a TCP/IP or other internet session, sends the user 204 a receipt of payment and acknowledgement of a completed transaction (step 7). Thereafter, at step 8, the payment processing center credits an account for the transaction.

Using the features shown in FIG. 4, consumers are protected against theft of information, or unauthorized use of their financial product, because the execution of the transaction is verified as genuine by the consumer's consent, the seller's consent, location verification, and by time stamping.

In accordance with an embodiment, security and personal identities for transactions are ensured as part of a new protocol for a cable environment. The new protocol preferably utilizes the physical characteristics of devices provided in the "last mile," as known in the art, to guarantee an audit of a location, time, and person. Preferably, one or more signatures are applied to transactions that are directly linked to properties regarding how a particular location is tied into a cable infrastructure. The signature encapsulates the identities of several physical objects or devices, each having a respective hardware signature. The combinatorics related to this type of security exceeds the value of two to the power of 32 (i.e., $2^{32}$). This is many magnitudes better than the known PGP encryption or, alternatively, 64 bit md5-hash encryption, of PKI (Public Key Infrastructure) technologies.

Thus, a new technology integrator is provided for a unique and truly secure validation process that protects the electronic transfer of digital assets and financial data. As e-commerce is expanding exponentially, solutions are provided herein to the frailties of existing transactional security measures, which have become apparent and costly. Particularly, a proprietary data transport system that secures transactions within existing distributed communications systems, such as cable television, satellite television, and mobile telephone technologies, is provided. A significant impact is provided by utilizing bridging vital internet transactions over distributed systems that have been secured in accordance with the teachings herein. This feature, referred to herein, generally, as a "bridge-to-internet" solution, enhances known internet technology and provides the security of a "hard wired" system for those transactions that need to be protected beyond what the internet currently can ensure. Protection from theft of data and money by moving secured transactions to a system where those problems do not exist is provided. This is a first for the internet and it answers issues of security, fraud, and user confidence beyond any existing security solution.

Most thefts and hacks on the internet occur from malicious people and software attempting to impersonate an element of the communication path, such as the user, a router, a server, or a web site. Such impersonations are not possible in accordance with the teachings herein. Instead, a consumer enjoys the freedom and expanse of choices previously expected from the internet. Once a consumer decides to make a purchase or exchange critical data, his/her private information is conveyed not via the internet, but via the systems and methods shown and described herein. Unlike prior art systems, private data are not transported exclusively over the internet.

Additionally, vendors and companies providing services on the internet can guarantee a new level of protection because the servers and systems that contain customer information will no longer be accessed through the public internet. The traditional CICS, or Customer Information Control Systems, would be "offline" and inaccessible from the internet. Costly breaches of security on the internet that typically originate from people accessing servers that contain financial information for thousands of users are now prevented.

The systems and methods herein do not replace existing known internet security measures, such as firewalls, key encryption, secured sockets layer, and PGP, but rather enhances and compliments these existing solutions at a more physical level. Users, vendors, and merchanting agents will all benefit from the systems and methods described herein. A technology enhancement is supported that is built on existing infrastructures, and hence, its speed of deployment, and growth are determined by the services already in use.

The systems and methods disclosed herein preclude penetrations from security, privacy, and financial threats is provided herein. In e-commerce applications, critical data are out of harm's way. For example, international piracy, identify fraud, malicious code, corporate espionage and hacking are thwarted.

In another embodiment, a consumer decides to make a purchase of a good. Data transport preferably begins when the seller of the good or consumer purchasing the good selects the middleware and data protocol for the sale mechanism. The consumer utilizes the middleware and secure data protocol to execute his/her payment method, and the financial product is executed. Thereafter, the seller's computer, e.g., server computer, sends a handshake command (as known in the art) to determine that the user has interactive technology, such as interactive cable television, and, if so, ensures that the technology is compliant with the teachings herein. In case the connection is compliant, a checkout display screen is preferably sent to the user via the set top box. The checkout page is preferably generated video that corresponds to the user's responses, such as name, address, credit information or the like. When the checkout page is complete, a validation request is transmitted to the seller and, when validated, a receipt is preferably transmitted to the user and fulfillment of the purchase occurs. In this way, the consumer is protected against theft of information, or unauthorized use of his/her financial product, because the execution of the transaction is verified as genuine by the consumer's consent, the seller's consent, location verification, and by time stamping. Further, the consumer and seller are protected from internet fraud during the transaction because the transaction itself does not occur on the internet; it occurs on a more secure "hard wired" (e.g., cable system secured via the teachings herein) system. The consumer and seller are protected from corporate piracy at all points of data storage because those points can not be "seen" or accessed from the internet. In other words, servers at a vendor's site contain critical user data are off the internet, and on the cable system.

Moreover, existing security platforms benefit from the teachings herein. Rather than pose a competitive challenge to current and developing security and privacy platforms, known security measures are enhanced and enriched. The systems and methods herein work in conjunction with known platforms, such as DOCSIS®, to maintain integrity and make them more potent. This is vital since DOCSIS was primarily developed to protect against theft of cable service from piracy and descramblers, and since current security measures require separate installations at the application program level. The systems and methods described herein "sit below" the DOCSIS transport, and guarantee security and privacy by seamlessly verifying the person and his action against what he is viewing at the time of his actions. Then, actions are verified and transactions are completed from a secure non-public location. In accordance with the teachings herein, data transfer activities occur off of the public internet, thereby fortifying existing security systems.

Thus and as described herein, a new security protocol is defined that provides protection beyond that previously available, for example, over the internet. The new protocol is preferably integrated into a new combination of hardware and software that makes the platform capable of being customized and licensed for various industries and uses, beyond gaming. Moreover, a use of a matrix switch, which is capable of connecting a plurality of input to a plurality of outputs, and operable with the data matching engine provides a convenient and cost-effective approach for distributing video across various platforms and over the "last mile."

The systems and methods for transmitting and validating data ensures that the platform is provided having an architecture that inherently prohibits known methods of online security fraud, hacking, and identity theft. Further, there is tremendous potential to generate revenue from the licensing of the systems and methods described herein. Low break even points, low start up costs, low scalability cost of growth, low subscriber requirements for success, low requirements in staffing and fixed assets and no technological/hardware infrastructure obstacles to growth are all factored together that results in a profitable and lucrative business model.

Although the present invention has been described in relation to particular embodiments thereof, many other variations and modifications and other uses will become apparent to those skilled in the art. For example, using the secured protocol and middleware described herein, health insurance providers can offer in-home access to confidential and previously unavailable medical records. In a preferred embodiment, a health channel is provided that includes a patient and doctor side. Patients retrieve information, shop for doctors, even pay medical bills or contact insurance companies. Doctors post medical results, schedule meetings and collect revenues. Both patients and doctors preferably store, retrieve, and view critical record and film, and comply with various requirements, such as defined by the Health Insurance Portability and Accountability Act ("HIPAA"). Such compliance is provided because a person, the person's location, and permission to view an object securely are validated and ensured.

The systems and methods described herein provide an effective risk management tool to reduce costs, for example, due to lawsuit stemming from lost records. In one business method, the middleware and secure protocol can be provided for a low fee, such as one dollar a month added value for health insurance carriers to offer to their subscribers, potentially netting tens of millions of dollars in previously unrealized capital.

In another embodiment, the middleware and secure protocol described herein can function to securely transport files between imaging centers and physicians' offices. A typical physicians' office with four to six physicians may spend an average of $150k per year on courier and transportation services. It is believed that those physicians would gladly pay more for a faster and safer delivery method. Moreover, many (if not most) physicians' offices would save an FTE (Full Time Equivalent person of 30k year) when they employ electronic records handling in accordance with the teachings herein. A proprietor of the systems and methods herein that provides a secure transport of files between hospitals and physicians' offices may result in earnings of hundreds of millions of dollars.

Moreover, similar to insurance companies, physicians who use the systems and methods described herein can offer records access to all their patients. The middle and secure protocol that offers such record access service at, for example, $5,000 per year, per practice, may net hundreds of millions of dollars.

In yet another application, the middleware and secure data protocol can be implemented for electronic bill payments. For example, the systems and methods described herein can be offered as a single source for all home maintenance bills such as oil, gas, electric, water, cable television, and/or telephone phone. This is believed to be an attractive alternative for many internet users who do not trust the internet for secure financial information. Such users would be more amenable to the secure platform provided herein, as well as the ease of use and overall convenience.

Accordingly, the middleware platform and corresponding data protocol that ensure secure, efficient and convenient operations for end-users, even for users who are not technically proficient, is provided. Moreover, a core technology is preferably provided that includes at least a matching engine that receives metadata representing a video feed, and metadata that represents a customer and the customer's actions, and matches the two sources of metadata. The two sources of data are preferably sequenced together for cross-referencing purposes. A physical topology or architecture is further disclosed that utilizes, in one embodiment, a cable television infrastructure that is supported by multiple system operators. Other embodiments include satellite television and cellular telephone technologies.

Further, a back-office technology is provided that includes a data storage element for storing digital video, video metadata, customer metadata and/or sequenced customer metadata with video metadata. The various data that are stored are preferably available 24-hours per day, seven days per week for access by a live help-desk or customer service operation. In this way, customer service is provided for customers that includes current and accurate data.

The features and advantages of the systems and methods provided herein are supported at least in part by a media matching engine, a data matching engine, an internet security bridge and a video validation protocol. Moreover, non-recursive, non-pattern generating signatures are provided, thereby precluding any party that attempts to eavesdrop or otherwise intercept transmissions set forth herein gains no meaningful access to information. Instead, data are preferably filtered such that only reference information is transmitted and that identifying data, such as names, addresses, bank accounts or other personally identifying information, which may be used by unscrupulous parties, are not transmitted.

Accordingly, the teachings herein effectively secure the transfer of private and personal data, for example, via interactive cable platforms and cell telephones. Such security is preferably provided and utilized over the internet, but without transmitting private data via HTTP connections on the internet. The teachings herein effectively and economically solve many data security issues-starting with ecommerce and personal financial data.

Although the present invention has been described in relation to particular embodiments thereof, many other variations and modifications and other uses will become apparent to those skilled in the art. It is envisioned and preferred, therefore, that the present invention not be limited by the specific disclosure, herein.

What is claimed is:

1. A method for secure transmission of electronic information, the method comprising:
   storing, in processor readable media, metadata associated with an interactive data feed;
   receiving, by an information processor and over the Internet from a first computing device associated with a vendor of goods or services, a request for establishing a secure transaction associated with a sales transaction of at least one of the goods or services, wherein the sales transaction involves a second computing device associated with a consumer and further wherein the first computing device and the second computing device are communicating via an Internet-based communication session;
   bridging, by the information processor, the Internet-based communication session to a second communication session, wherein the second communication session supports transmission of the interactive data feed;
   receiving, by the information processor from the second computing device, first information that is at least associated with the interactive data feed;
   validating, by the information processor, the first information with the metadata;
   providing, by the information processor, matched metadata as a function of the validating; and
   transmitting, by the information processor to the first computing device, information associated with the matched metadata to facilitate the sales transaction.

2. The method of claim 1, wherein the interactive data feed is provided at least in part on a web browser software application running on the second computing device.

3. The method of claim 1, further comprising generating, by at least one selected from a group of the information processor, the first computing device, the second computing device and a third computing device, feedback that represents input by the second computing device, wherein the feedback is displayed on the second computing device.

4. The method of claim 3, wherein the third computing device is associated with at least one selected from a group of a cable television service operator, a satellite television service provider and a cellular telephone service provider.

5. The method of claim 1, further comprising tracking, by the information processor, at least one action taken by at least one of the first computing device and the second computing device.

6. The method of claim 5, further comprising providing, by the information processor, an audit trail based on the tracking.

7. The method of claim 6, wherein the audit trail provides for regulatory compliance.

8. The method of claim 1, further comprising providing, by at least one selected from a group of the information processor, the first computing device, the second computing device and a third computing device, at least one respective non-pattern generating signature for at least one of the first computing device and the second computing device.

9. The method of claim 8, wherein the non-pattern generating signature is non-recursive.

10. The method of claim 1, further comprising delaying, by an amount of time, at least one transmission that is sent by the first computing device or the second computing device and that is received by second computing device or the first computing device.

11. The method of claim 1, further comprising receiving, by the information processor, electronic payment from at least one selected from a group of the vendor of goods or services, the consumer, and a multiple system operator.

12. The method of claim 1, further comprising transmitting, from at least one channel, electronic information representing at least one action taken by the second computing device, wherein the at least one channel is at least one selected from a group of a cable station, a sub-channel on a cable station and an interactive add-in.

13. The method of claim 1, wherein the services include at least one banking service.

14. A system for secure transmission of electronic information, the method comprising:
   an information processor that sends and receives electronic information over a communication network, wherein the information processor is configured with instructions that, when executed, cause the information processor to:
   store, in processor readable media, metadata associated with an interactive data feed;
   receive over the Internet from a first computing device associated with a vendor of goods or services, a request for establishing a secure transaction associated with a sales transaction of at least one of the goods or services, wherein the sales transaction involves a second computing device associated with a consumer and further wherein the first computing device and the second computing device are communicating via an Internet-based communication session;
   bridge the Internet-based communication session to a second communication session, wherein the second communication session supports transmission of the interactive data feed;
   receive, from the second computing device, first information that is at least associated with the interactive data feed;
   validate the first video information with the video metadata;
   provide matched metadata as a function of the validating; and
   transmit the matched metadata to facilitate the sales transaction.

15. The system of claim 14, wherein the interactive data feed is provided at least in part on a web browser software application running on the second computing device.

16. The system of claim 14, wherein the information processor is further configured with instructions that, when executed, cause the information processor to generate feedback that represents input by the second computing device, wherein the feedback is displayed on the second computing device.

17. The system of claim 14, wherein the information processor is further configured with instructions that, when executed, cause the information processor to track at least one action taken by at least one of the first computing device and the second computing device.

18. The system of claim 17, wherein the information processor is further configured with instructions that, when executed, cause the information processor to provide an audit trail based on the tracking.

19. The system of claim 18, wherein the audit trail provides for regulatory compliance.

20. The system of claim 14, wherein the information processor is further configured with instructions that, when executed, cause the information processor to provide at least one respective non-pattern generating signature for at least one of the first computing device and the second computing device.

21. The system of claim 20, wherein the non-pattern generating signature is non-recursive.

22. The system of claim 14, wherein the information processor is further configured with instructions that, when executed, cause the information processor to delay, by an amount of time, at least one transmission that is sent by the first computing device or the second computing device and that is received by second computing device or the first computing device.

23. The system of claim 14, wherein the information processor is further configured with instructions that, when executed, cause the information processor to receive electronic payment from at least one selected from a group of the vendor of goods or services, the consumer, and a multiple system operator.

24. The system of claim 14, wherein the services include at least one banking service.

25. A method for secure transmission of electronic information, the method comprising:
   storing, in processor readable media, metadata associated with an interactive data feed;
   receiving, by an information processor and over the Internet from a first computing device associated with a consumer, a request for establishing a secure transaction associated with a sales transaction of at least one of the goods or services, wherein the sales transaction involves a second computing device associated with a vendor of goods or services and further wherein the first computing device and the second computing device are communicating via an Internet-based communication session;
   bridging, by the information processor, the Internet-based communication session to a second communication session, wherein the second communication session supports transmission of an interactive data feed;
   receiving, by the information processor from the first computing device, first information that is at least associated with the interactive data feed;
   validating, by the information processor, the first information with the metadata;
   providing, by the information processor, matched metadata as a function of the validating; and
   transmitting, by the information processor to the second computing device, information associated with the matched metadata to facilitate the sales transaction.

26. The system of claim 25, wherein the interactive data feed is provided at least in part on a web browser software application running on the first computing device.

* * * * *